US012736391B2

(12) United States Patent
Wenzel et al.

(10) Patent No.: US 12,736,391 B2
(45) Date of Patent: Sep. 15, 2026

(54) FLUID FLOW METER, MONITORING SYSTEM COMPRISING AT LEAST ONE SUCH FLUID FLOW METER AND METHOD FOR OPERATING A FLUID FLOW METER

(71) Applicant: SICK Engineering GmbH, Ottendorf-Okrilla (DE)

(72) Inventors: Jörg Wenzel, Dippoldiswalde (DE); Daniel Heinig, Dresden (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 294 days.

(21) Appl. No.: 18/605,025

(22) Filed: Mar. 14, 2024

(65) Prior Publication Data

US 2024/0310201 A1 Sep. 19, 2024

(30) Foreign Application Priority Data

Mar. 16, 2023 (DE) ........................ 102023106668.4

(51) Int. Cl.
*G01F 25/10* (2022.01)
*G01F 1/667* (2022.01)

(52) U.S. Cl.
CPC .............. *G01F 25/15* (2022.01); *G01F 1/668* (2013.01)

(58) Field of Classification Search
CPC ........... G01F 25/00; G01F 25/10; G01F 25/15
See application file for complete search history.

(56) References Cited

U.S. PATENT DOCUMENTS 7,885,790 B2 * 2/2011 Straub, Jr. ............... G01F 1/667 702/182
9,024,767 B2 * 5/2015 Ramsay .................... G01F 1/66 340/506
11,415,447 B2 * 8/2022 Cunningham ........ G01F 1/8409
2009/0097354 A1 * 4/2009 Straub, Jr. .............. G01F 25/10 367/13
2011/0277558 A1 11/2011 Dietz et al.

(Continued)

FOREIGN PATENT DOCUMENTS

CN 115371750 A * 11/2022 ............ G01F 1/668
DE 102012104042 A1 11/2013

(Continued)

OTHER PUBLICATIONS

Machine Translation of CN-115371750-A (Year: 2022).*

(Continued)

*Primary Examiner* — Nguyen Q. Ha
(74) *Attorney, Agent, or Firm* — Nath, Goldberg & Meyer; Jerald L. Meyer

(57) ABSTRACT

A fluid flow meter serves to determine a flow of a fluid, in particular in a form of gas, in a pipe, wherein the fluid flow meter is configured to generate a first measurement variable and at least one second measurement variable for the fluid, and to generate at least one first diagnostic parameter. The fluid flow meter comprises a diagnostic system that is configured to determine a first threshold value for the at least one first diagnostic parameter based on the first measurement variable and the at least one second measurement variable, and to output a first message to a higher-ranking control device when the at least one first diagnostic parameter reaches said first threshold value.

21 Claims, 4 Drawing Sheets

(56) References Cited

U.S. PATENT DOCUMENTS

| | | | | |
|---|---|---|---|---|
| 2015/0292926 | A1 | 10/2015 | Takemura et al. | |
| 2017/0082480 | A1* | 3/2017 | Sai | G01F 25/10 |
| 2020/0041327 | A1 | 2/2020 | Brusilovsky | |
| 2020/0166398 | A1* | 5/2020 | Collister | G06F 11/0751 |
| 2022/0018695 | A1 | 1/2022 | Huang et al. | |
| 2025/0198816 | A1* | 6/2025 | Brown | G01F 25/10 |

FOREIGN PATENT DOCUMENTS

| | | | |
|---|---|---|---|
| DE | 102017213084 | A1 | 1/2019 |
| DE | 102018133316 | A1 | 6/2020 |
| DE | 202020003345 | U1 | 9/2020 |
| DE | 102020002837 | A1 | 11/2021 |
| EP | 3910296 | A1 | 11/2021 |
| WO | 2012016581 | A1 | 2/2012 |
| WO | 2013167385 | A1 | 11/2013 |
| WO | 2020112731 | A1 | 6/2020 |

OTHER PUBLICATIONS

German Official letter dated Nov. 30, 2023 corresponding to application No. 102023106668.4.

EuropeanSearch Report for corresponding application 24161658.0 issued Aug. 29, 2024.

* cited by examiner

FLUID FLOW METER, MONITORING SYSTEM COMPRISING AT LEAST ONE SUCH FLUID FLOW METER AND METHOD FOR OPERATING A FLUID FLOW METER

BACKGROUND

The invention relates to a fluid flow meter, to a monitoring system comprising at least one such fluid flow meter, and to a method for operating a fluid flow meter.

Fluid flow meters are used today for flow measurement of fluids in pipes or pipelines. The flow measurement serves, for example, to calculate a fluid flow or a quantity of fluid transferred through a pipe.

A fluid is understood as both liquids and gases. In this respect, the invention in particular relates to fluid flow meters for gases. Such a gas can, for example, be natural gas that is transmitted in a natural gas pipeline or natural gas pipe. If the gas composition changes, for example because the hydrogen content in the natural gas fluctuates, this can have an impact on the diagnostic capability of the fluid flow meter.

It is therefore desirable to provide a fluid flow meter that can provide information on whether the fluid flow meter functions correctly or whether the fluid flow meter correctly measures by correctly calculating a fluid flow or a fluid quantity transferred in a pipe, or whether the flow meter requires maintenance.

SUMMARY

The object is satisfied by the fluid flow meter, by a monitoring system comprising such a fluid flow meter, and by a method for operating such a fluid flow meter. Advantageous further developments of the fluid flow meter are specified in the dependent claims.

The fluid flow meter according to the invention serves to determine, in particular to calculate a flow of a fluid, or a fluid quantity transferred, in particular in the form of (natural) gas, in a pipe. A flow is understood as how much fluid flows through the pipe in a predefined time. The fluid flow meter is configured to generate a first measurement variable and at least one second measurement variable for the fluid and at least one first diagnostic parameter. The fluid flow meter further comprises a diagnostic system that is configured to determine a first threshold value for the at least one first diagnostic parameter based on the first measurement variable and the at least one second measurement variable.

The diagnostic system is further configured to output a first message to a higher-ranking control device when the first threshold value is reached. The wording “reaching” also includes “exceeding” or “falling below”, depending on the type of threshold value. It is particularly advantageous that the fluid flow meter generates at least two measurement variables (that are different in their type) for the fluid and, based on the at least two measurement variables, the diagnostic system generates the at least one first diagnostic parameter.

It is particularly advantageous here that the threshold value for the at least one first diagnostic parameter is determined based on the at least two measurement variables. The threshold value can thereby be changed much more precisely during operation based on current measurement variables and can be adapted to the fluid currently flowing through the pipe. Depending on the type of measurement variable, it can, for example, also change if the gas composition of the fluid changes. In this case, the threshold value is adapted and the fluid flow meter outputs the first message at a different value for at least one diagnostic parameter.

It is therefore possible that if the first and/or second measurement variable changes, the message is output to the higher-ranking control device that would not have been output at the original values for the first and/or second measurement variable. Conversely, it is naturally also possible that if the first and/or second measurement variable changes, the message that would have been output at the original values for the first and/or second measurement variable is not output to the higher-ranking control device. It is in particular advantageous that the threshold value is not only calculated based on a single measurement variable of the fluid, but that two different measurement variables are used for calculating at least one first threshold value.

By continuously adapting the first threshold value for the at least one first diagnostic parameter during operation of the fluid flow meter, a statement can always be made for different operating states (e.g. different fluid compositions) as to whether the fluid flow meter is functioning correctly, i.e. in particular whether the measurement capability is sufficient and/or whether the fluid flow meter determines the flow with a desired accuracy, or whether maintenance is necessary. For example, the at least one first threshold value is adapted when the natural gas contains more or less hydrogen or if pure hydrogen is measured or if $CO_2$ is measured. With the present invention here, it is thus inter alia possible to react to a fluid composition that changes during operation and to ensure the diagnostic capability of the device.

In an advantageous further development of the fluid flow meter, the fluid flow meter is configured to average a plurality of first measurement variables to use this result for the calculation of the first threshold value. Additionally or alternatively, the fluid flow meter is likewise configured to average a plurality of second measurement variables to use this result for the calculation of the first threshold value.

In an advantageous further development of the fluid flow meter, the fluid flow meter is configured to continuously generate the first diagnostic parameter again and to compare it with the first threshold value. The first threshold value, which is recalculated based on the respective current value for the first and at least one second measurement variable, is likewise updated continuously.

In an advantageous further development, the diagnostic system is configured to determine a second threshold value for the at least one first diagnostic parameter, in particular both the first threshold value and the second threshold value are based on the first measurement variable and the at least one second measurement variable, and to output a second message to the higher-ranking control device when the at least one first diagnostic parameter reaches said second threshold value, wherein the first message is a warning message or a fault message and wherein the second message is also a warning message or a fault message. The first and the second message may be of different types (warning message or fault message). The wording “reaching” also includes “exceeding” or “falling below”, depending on the type of threshold value. The first and the second threshold value are at different levels. It is particularly advantageous that a second threshold value is also determined in addition to a first threshold value. Ranges for the at least first diagnostic parameter in which no or different messages are output can thereby be set. A warning message can thus indicate a future event and prompt the operator of the fluid flow meter to check the corresponding fluid flow meter at the next opportunity. A fault message, on the other hand, signals to the operator of the fluid flow meter that valid measurement values for the flow are no longer being generated. The diagnostic system is preferably configured to write the warning message and/or the fault message to an error register in the fluid flow meter and/or to an error register of a processing unit of the higher-ranking control device. The diagnostic system is further preferably configured to also write a time stamp to the error register in addition to the warning message and/or the fault message. Additionally or alternatively, the diagnostic system is configured to write the flow value of the fluid flow meter to the error register when the warning message and/or the fault message occurs.

In an advantageous further development, the at least one first measurement variable is a physical measurement value of the fluid or a variable derived from a physical measurement value. Additionally or alternatively, the at least one second measurement variable is a physical measurement value of the fluid or a variable derived from a physical measurement value. The first and second measurement variables are of different types.

In an advantageous further development, the first measurement variable is selected from a fluid flow rate, a speed of sound in the fluid or a speed of sound in the fluid normalized to pressure and temperature. The fluid flow rate and the speed of sound in the fluid are physical measurement values. The speed of sound in the fluid normalized to pressure and temperature is a variable derived from a physical measurement value. Additionally or alternatively, the second measurement variable is selected from a fluid flow rate, a speed of sound in the fluid or a speed of sound in the fluid normalized to pressure and temperature. The fluid flow rate and the speed of sound in the fluid are physical measurement values. The speed of sound in the fluid normalized to pressure and temperature is a variable derived from a physical measurement value. In this respect, the first and the second measurement variables comprise different fluid properties. For example, the first measurement variable can be the fluid flow rate and the second measurement variable can be the speed of sound in the fluid. The first measurement variable and/or the second measurement variable can naturally also be selected from other fluid properties.

In an advantageous further development, the at least one first diagnostic parameter describes a measurement capability of the fluid flow meter or allows conclusions to be drawn about a measurement capability. For example, the first diagnostic parameter can be determined, i.e. derived, in particular calculated, from the first measurement variable and/or the second measurement variable.

In an advantageous further development, the at least one first diagnostic parameter is a signal-to-noise ratio (SNR) or a turbulence of the fluid. The first and optionally the second threshold values specify a value for the signal-to-noise ratio; when said value is reached or in this case is fallen below, the first message and optionally the second message are generated and output to the higher-ranking control device. Such a signal-to-noise ratio, for example, describes the signal quality and thus how accurately (or conversely, how inaccurately) the fluid flow meter currently operates. In addition, the first and optionally the second threshold values can specify a value for the turbulence of the fluid; when said value is reached or in this case is exceeded, the first message and optionally the second message is generated and output to the higher-ranking control device. Such a value for the turbulence likewise describes how accurately (or conversely, how inaccurately) the fluid flow meter currently operates.

It is particularly advantageous here that the first measurement variable and the second measurement variable describe a fluid property, wherein the first and optionally the second threshold values for the diagnostic parameter, for example in the form of the signal-to-noise ratio or the turbulence, are determined in dependence on the fluid property. The first and optionally the second threshold values are thus set in dependence on the two measurement variables describing the fluid property. If, for example, the fluid flow rate (first measurement variable) and the speed of sound in the fluid (second measurement variable) change, different first and optionally second threshold values can be set in dependence on different values for the fluid flow rate and the speed of sound in the fluid.

In an advantageous further development, the diagnostic system comprises a memory unit in which a look-up table is stored. The diagnostic system is configured to read out the first threshold value for the at least one first diagnostic parameter from the look-up table in dependence on the at least one first and second measurement variables. During operation of the fluid flow meter, a new value for the first threshold value can be read out continuously based on the first and second measurement variables. The memory unit can, for example, be directly integrated in the fluid flow meter. The memory unit can also be arranged remotely, for example in the control device. In addition, it is also conceivable that the diagnostic system is configured to read out the second threshold value for the at least one first diagnostic parameter from the look-up table in dependence on the at least one first and second measurement variables. This can likewise take place continuously in dependence on the first and second measurement variables. It is also conceivable that the second threshold value is determined from the first read-out threshold value. For example, the diagnostic system can be configured to space apart the second threshold value by a specific value from the first read-out threshold value, i.e. the second threshold value can e.g. be greater or less than the first threshold value by the specific value. In this case, only one threshold value, in particular the first threshold value, has to be read out from the look-up table.

In an advantageous further development, the diagnostic system comprises an AI module, in particular a trained AI module. The AI module is configured to determine the first threshold value for the at least one first diagnostic parameter in dependence on the at least one first and second measurement variables. The AI module preferably comprises at least two input nodes, a plurality of intermediate nodes and at least one output node. The first and the second measurement variables are fed to the two input nodes. The first threshold value is output at the at least one output node. The AI module can be trained using training data. These training data comprise a plurality of data sets, wherein each data set comprises at least one value for the first measurement variable, one value for the second measurement variable and one value for the first threshold value. The training data can in this respect comprise more than 100, 1000, 10,000 or more than 100,000 data sets. The AI module can naturally also be configured to determine the second threshold value for the at least one first diagnostic parameter in dependence on the at least one first and second measurement variable. In this case, the AI module preferably also comprises at least two input nodes, a plurality of intermediate nodes and at least one output node. The first and second measurement variables are fed to the two input nodes. The second threshold value is output at the at least one output node. The AI module can be trained using training data. These training data comprise a plurality of data sets, wherein each data set comprises a value for the first measurement variable, a value for the second measurement variable and a value for the second threshold value. The training data can in this respect comprise more than 100, 1000, 10,000 or more than 100,000 data sets. Alternatively, it would be conceivable for the AI module to comprise at least two input nodes, a plurality of intermediate nodes and two output nodes. The first and the second measurement variables are fed to the two input nodes. The first threshold value is output at the first output node. The second threshold value is output at the second output node. The AI module can be trained using training data. These training data comprise a plurality of data sets, wherein each data set comprises a value for the first measurement variable, a value for the second measurement variable, a value for the first threshold value and a value for the second threshold value. The training data can in this respect comprise more than 100, 1000, 10,000 or more than 100,000 data sets.

In an advantageous further development, the fluid flow meter is configured to generate at least one second diagnostic parameter that is different from the first diagnostic parameter. The diagnostic system is configured to determine a first threshold value for the at least one second diagnostic parameter also based on the first measurement parameter and on the at least one second measurement parameter in order to output a first message to the higher-ranking control device when said first threshold value is reached. For example, the second diagnostic parameter can be a signal-to-noise ratio or a turbulence of the fluid. It is particularly advantageous that the first threshold value can likewise be determined using the first and second measurement variables. Other measurement variables can naturally also be used for this purpose. The wording "reaching" also includes "exceeding" or "falling below", depending on the type of threshold value. The first message is preferably a warning message. It could also be a fault message. It is generally conceivable that the diagnostic system is further configured to determine a second threshold value for the at least one second diagnostic parameter based on the first measurement variable and on the at least one second measurement variable in order to output a first message to the higher-ranking control device when said second threshold value is reached. It is particularly advantageous that the second threshold value can likewise be determined using the first and second measurement variables. Further measurement variables can naturally also be used for this purpose. The wording "reaching" also includes "exceeding" or "falling below", depending on the type of threshold value. The second message is preferably a fault message. By using a second diagnostic parameter, it is possible to operate the fluid flow meter even more accurately. Furthermore, the fluid flow meter can, for example, be configured to continuously recalculate, i.e. update, the second diagnostic parameter. This can result in the first or second message being output, even if the first or second threshold value has not changed.

In an advantageous further development, the fluid flow meter comprises a measurement device having a first transmission and reception unit, and a second transmission and reception unit. The first transmission and reception unit is configured to generate a first ultrasonic signal and preferably to transmit it directly in the direction of the second transmission and reception unit and to receive a second ultrasonic signal. The second transmission and reception unit is configured to generate and transmit the second ultrasonic signal and preferably to transmit it directly in the direction of the first transmission and reception unit and to receive the first ultrasonic signal. The first and the second transmission and reception units can be attached to the pipe offset both in the peripheral direction of the pipe and in the axial direction of the pipe. The measurement device is configured to determine the first and the second measurement variables, in particular by means of the first and second transmission and reception units. For example, it is possible to determine the fluid flow rate and the speed of sound in the fluid via the first and second transmission and reception units. This is possible since the first and the second transmission and reception unit are arranged offset in the axial direction, whereby, in a fluid that flows through the pipe, the ultrasonic signal propagation time for the first ultrasonic signal differs from the ultrasonic signal propagation time for the second ultrasonic signal. This difference in the signal propagation time is in particular dependent on the fluid flow rate, the fluid temperature, the fluid pressure and the fluid composition. The first and the second ultrasonic signal are transmitted through the interior of the pipe.

In an advantageous further development, the measurement device comprises at least one pressure sensor that is configured to measure the pressure of the fluid inside the pipe. Additionally or alternatively, the measurement device comprises at least one temperature sensor that is configured to measure the temperature of the fluid inside the pipe. Depending on these parameters, it is in particular possible to determine the fluid flow rate, the speed of sound in the fluid or a speed of sound in the fluid normalized to pressure and temperature. Alternatively, the pressure and temperature values can also be written to the device from external if no sensors are installed at the measurement device itself.

In an advantageous further development, the measurement device comprises at least one A/D converter. This at least one A/D converter is configured to determine the first ultrasonic signal, the second ultrasonic signal, the pressure signal and/or the temperature signal. The signal-to-noise ratio can describe the signal quality of the respective signal towards the noise floor. The at least one A/D converter can, for example, comprise a plurality of channels. A plurality of A/D converters that, for example, each comprise one channel can also be used.

The monitoring system according to the invention comprises at least one fluid flow meter described above. The monitoring system furthermore comprises a control device. The at least one fluid flow meter can be attached to the at least one pipe or can be installed in the pipe. The at least one fluid flow meter is configured to determine how much fluid flows through the pipe in a certain time. The at least one fluid flow meter is further configured to transmit the first message to the control device, wherein the control device is configured to present the first message or a message derived therefrom visually and/or acoustically. It is particularly advantageous that the control device presents the first message visually and/or acoustically for the operating personnel since the current status of the fluid flow meter can thereby be concluded very quickly. It is also conceivable that a plurality of fluid flow meters, which can be attached to the same pipe and/or to different pipes, are connected to the control device.

The method according to the invention serves to operate a fluid flow meter, in particular one described above. The fluid flow meter is configured to determine the flow of a fluid, in particular in the form of gas, in a pipe. In a first method step, a first measurement variable and at least one second measurement variable are generated for the fluid. Furthermore, at least one first diagnostic parameter is generated. In a second method step, a first threshold value for the at least one first diagnostic parameter is determined based on the first measurement variable and based on the at least one second measurement variable. In a third method step, a first message is output to a higher-ranking control device when a first threshold value for the diagnostic parameter, which is in particular updated continuously, is reached.

The invention will be described purely by way of example with reference to the drawings in the following. There are shown:

DETAILED DESCRIPTION OF THE EMBODIMENTS

Figure 1:
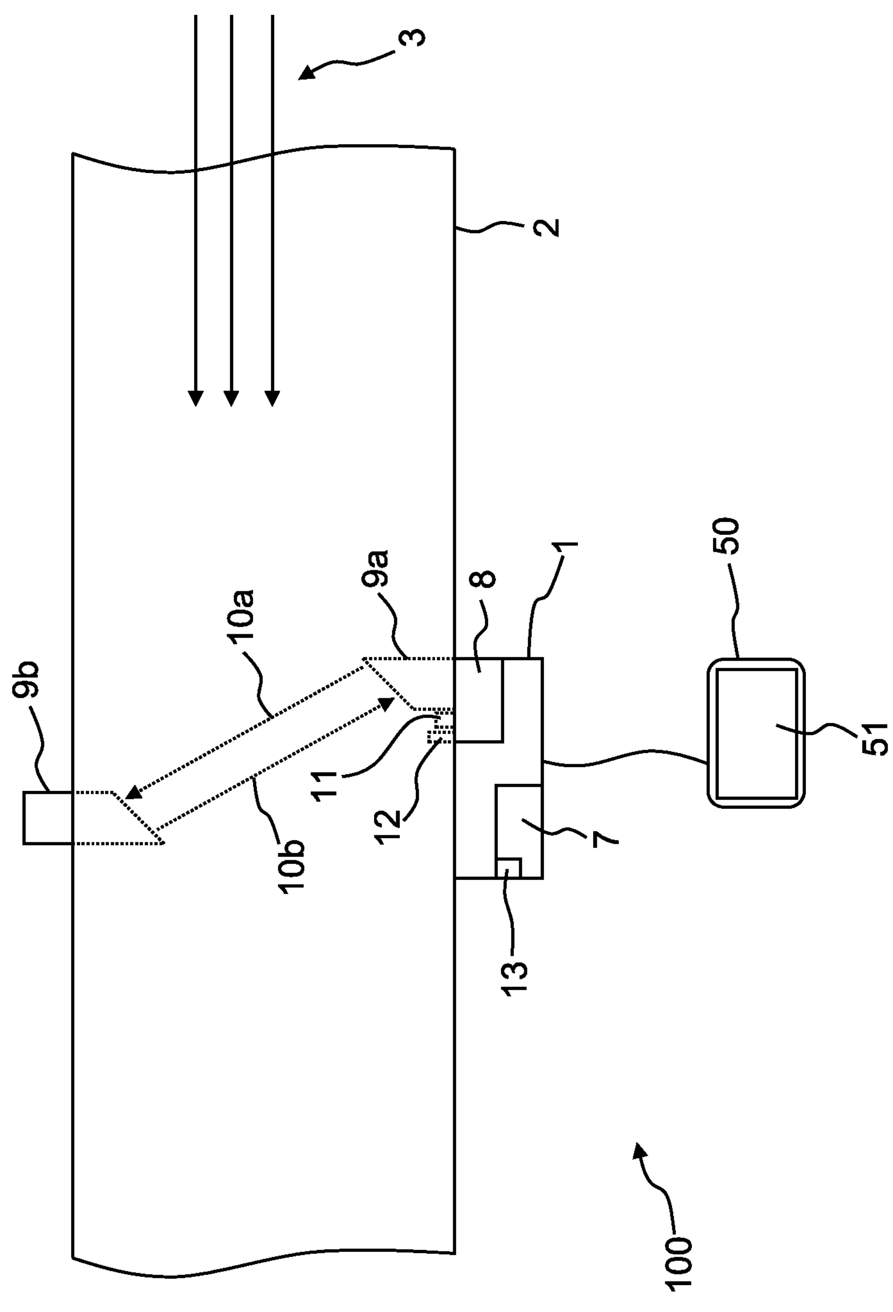
FIGS. 1, 2: various embodiments of a monitoring system comprising a fluid flow meter and a control device.

FIG. 1 shows an embodiment of a monitoring system 100 comprising a fluid flow meter 1 and a control device 50. The fluid flow meter 1 is attached to a pipe 2 through which a fluid 3 flows. The monitoring system 100 can naturally comprise a plurality of fluid flow meters 1 that are attached to different positions of the same pipe 2 or to different pipes 2. The fluid flow meter 1 is configured to determine how much fluid 3 flows through the pipe 2 in a certain time. The fluid 3 is in particular (natural) gas. The fluid 3 can also be hydrogen or a mixture of natural gas and hydrogen.

The fluid flow meter 1 is configured to generate a first message and to transmit it to the control device 50. The first message is in particular generated and transmitted to the control device 50 when, for example, diagnostic values, such as the accuracy with which the fluid flow meter 1 measures the flow of the fluid 3 through the pipe 2, decrease, in particular fall below a first threshold value 4*a*.

The control device 50 comprises an output unit 51, in particular in the form of a screen. The at least one first message or a message derived therefrom can be visually (and/or acoustically) presented on this output unit 51. In addition or as an alternative thereto, the first message or a message derived therefrom can be transmitted to a connected control device via digital interfaces. The output unit 51 can also be a web server that provides data that can be accessed from a computer, a tablet or a smartphone. One fluid flow meter 1 or a plurality of fluid flow meters 1 can be connected to the control device 50.

Figure 3:
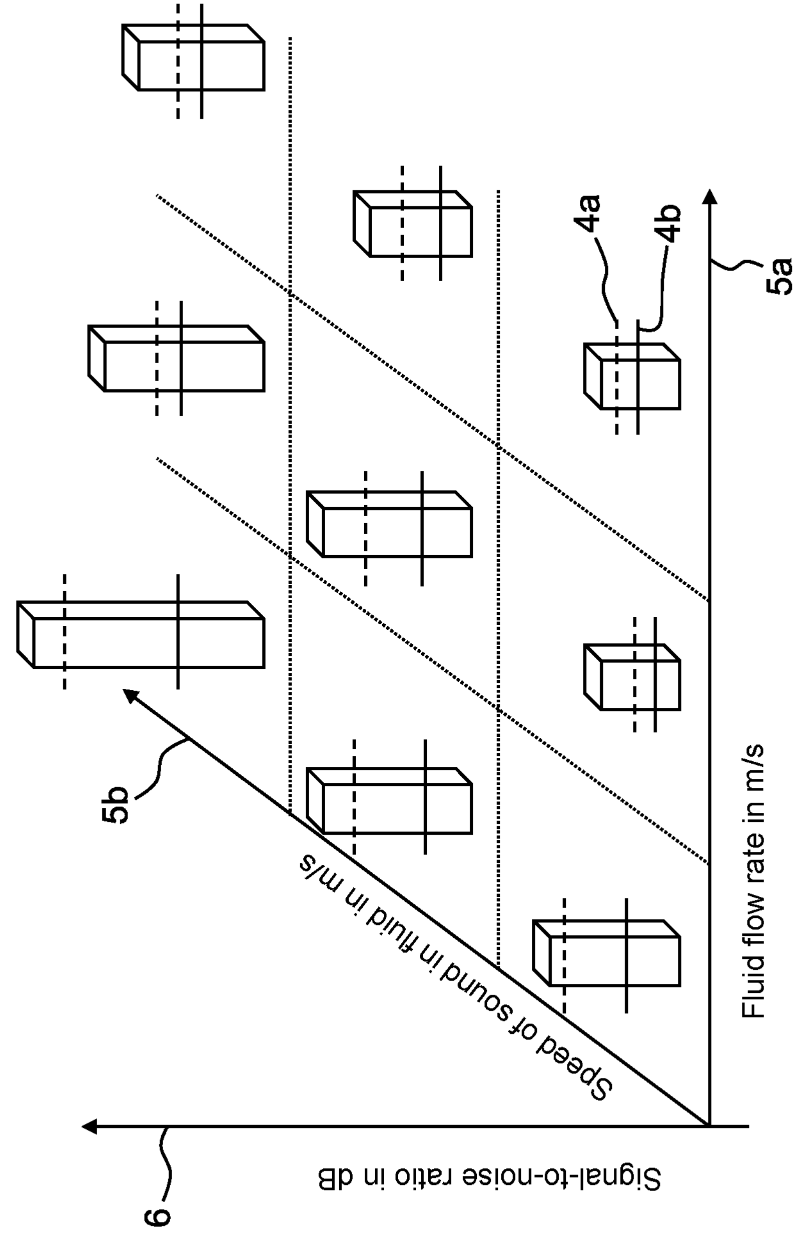
FIG. 3: an embodiment that explains how a first and a second threshold value for a first diagnostic parameter is determined in dependence on a first measurement variable and a second measurement variable.

The fluid flow meter 1 is configured to generate a first measurement variable 5*a*, at least one second measurement variable 5*b* and at least one first diagnostic parameter 6 (see FIG. 3). The first and/or second measurement variable 5*a*, 5*b* is preferably a physical measurement value, such as a fluid flow rate or a speed of sound in the fluid 3, or a variable derived from a physical measurement value, such as a speed of sound in the fluid 3 normalized to pressure and temperature. The at least one first diagnostic parameter 6 can, for example, be a signal-to-noise ratio or a turbulence of the fluid 3. The at least one first diagnostic parameter 6 therefore allows conclusions to be drawn about a measurement accuracy of the fluid flow meter 1 or describes such a measurement accuracy.

The fluid flow meter 1 further comprises a diagnostic system 7 that is configured to determine a first threshold value 4*a* for the at least one first diagnostic parameter 6 based on the first measurement variable 5*a* and on the at least one second measurement variable 5*b* and to output a first message to the higher-ranking control device 50 when said first threshold value 4*a* is reached. The first message is preferably a warning message. However, it can also be a fault message. The diagnostic system 7 is preferably further configured to determine a second threshold value 4*b* (FIG. 3) for the at least one first diagnostic parameter 6 based on the first measurement variable 5*a* and the at least one second measurement variable 5*b* and to output a second message to the higher-ranking control device 50 when said second threshold value 4*b* is reached. The second message is a warning message.

The fluid flow meter 1 further comprises a measurement device 8 that is configured to detect the first and the at least one second measurement variables 5*a*, 5*b*. The at least one first diagnostic parameter 6 being the signal-to-noise ratio or the turbulence of the fluid 3 can in this respect refer to the first and/or the at least one second measurement variable 5*a*, 5*b*.

The measurement device 8 comprises a first transmission and reception unit 9*a* and a second transmission and reception unit 9*b*. The first transmission and reception unit 9*a* is configured to generate and transmit a first ultrasonic signal 10*a* and to receive a second ultrasonic signal 10*b*. The second transmission and reception unit 9*b* is configured to generate and transmit the second ultrasonic signal 10*b* and to receive the first ultrasonic signal 10*a*. The first and the second transmission and reception unit 9*a*, 9*b* are in this respect arranged at the pipe 2 offset both in the peripheral direction and in the axial direction. The measurement device 8 is configured, for example, to determine the first and the at least one second measurement variables 5*a*, 5*b* via the first and second transmission and reception units 9*a*, 9*b*. The first and second transmission and reception units 9*a*, 9*b* are naturally configured to transmit the first and second ultrasonic signals 10*a*, 10*b* through the fluid 3.

The first transmission and reception unit 9*a* is configured to transmit the first ultrasonic signal 10*a* through the interior of the pipe 2 to the second transmission and reception unit 9*b*, wherein the second transmission and reception unit 9*b* is configured to receive the first ultrasonic signal 10*a* and to transmit the second ultrasonic signal 10*b* through the interior of the pipe 2 to the first transmission and reception unit 9*a*. The first transmission and reception unit 9*a* is in turn configured to receive the second ultrasonic signal 10*b*. The first and second transmission and reception units 9*a*, 9*b* are in particular arranged relative to one another such that there is visual contact between the first and second transmission and reception units 9*a*, 9*b* inside the pipe 2.

The first and/or second transmission and reception unit 9*a*, 9*b* can be at least partly arranged in the housing of the fluid flow meter 1. The first and/or second transmission and reception unit 9*a*, 9*b* can also be arranged spaced apart from the housing of the fluid flow meter 1 and can be connected to the fluid flow meter 1 via a corresponding data link (analog and/or digital). The same can also apply to a pressure sensor 11 and/or a temperature sensor 12.

In FIG. 1, the diagnostic system 7 is arranged within the housing of the fluid flow meter 1.

The measurement device 8 preferably also comprises the pressure sensor 11 that is configured to measure a pressure of the fluid 3 inside the pipe 2. In addition or alternatively, the measurement device 8 also comprises at least one temperature sensor 12 that is configured to measure a temperature of the fluid 3 inside the pipe 2.

The diagnostic system 7 further preferably also comprises a memory unit 13. A look-up table is stored in the memory unit 13. The diagnostic system 7 is configured to read out the first threshold value 4*a* for the at least one first diagnostic parameter 6 from the look-up table in dependence on the first and the at least one second measurement variables 5*a*, 5*b*.

Figure 2:
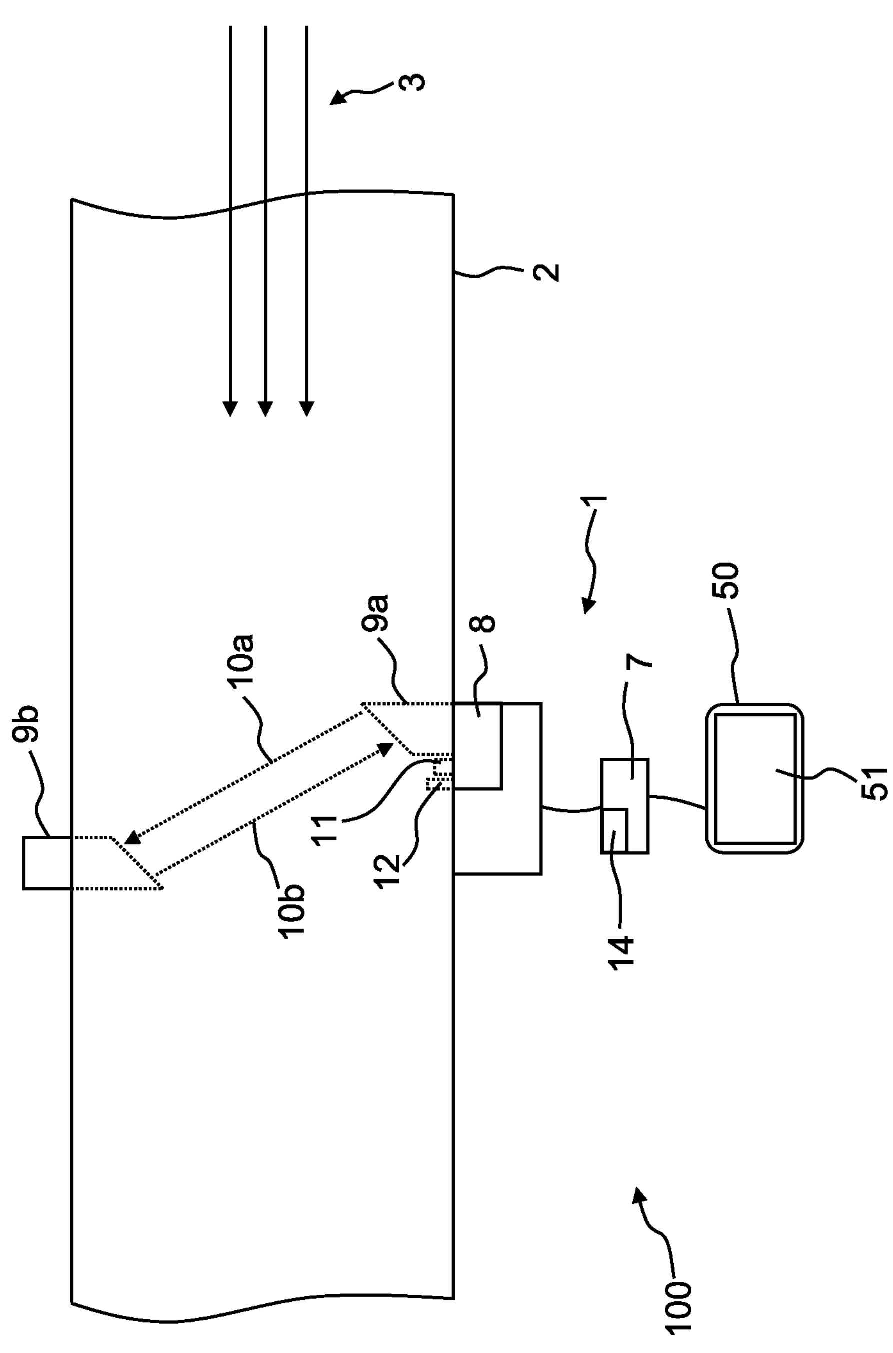

A further embodiment of the monitoring system 100 comprising the fluid flow meter 1 and the control device 50 is shown in FIG. 2. The differences from the embodiment from FIG. 1 are described below. The diagnostic system 7 is arranged spaced apart from the housing of the fluid flow meter 1 in which the measurement device 8 is arranged. For example, the diagnostic system 7 can be arranged at the location of the control device 50. In this embodiment, a data communication takes place from the measurement device 8 to the diagnostic system 7. Furthermore, a data communication takes place from the diagnostic system 7 to the control device 50. It is preferably a case of a digital interface here. The diagnostic system 7 further comprises an AI module 14. The AI module 14 is configured to determine the first threshold value 4*a* for the at least one first diagnostic parameter 6 in dependence on the first and the at least one second measurement variables 5*a*, 5*b*.

FIG. 3 shows an embodiment that explains how a first and second threshold value 4*a*, 4*b* for the first diagnostic parameter 6 is determined in dependence on a first measurement variable 5*a* and a second measurement variable 5*b*. In this case, the first measurement variable 5*a* is a fluid flow rate of the fluid 3. The second measurement variable 5*b* is the speed of sound in the fluid 3. The first diagnostic parameter 6 is determined for different pairings of the first measurement variable 5*a* and the second measurement variable 5*b*. Furthermore, the first threshold value 4*a* (solid line) and the second threshold value 4*b* (dashed line) are determined based on the first measurement variable 5*a* and the second measurement variable 5*b*. If the first or second threshold value 4*a*, 4*b* is reached or exceeded (e.g., the generated first diagnostic parameter 6 being the signal-to-noise ratio 6 is equal to or higher the first threshold 4*a*) or fallen below (e.g., the generated first diagnostic parameter 6 being the signal-to-noise ratio 6 is smaller than the second threshold 4*b*), the respective first and/or second message is generated and transmitted to the higher-ranking control device 50. This information regarding the first and second threshold values 4*a*, 4*b* can be stored in the look-up table. The look-up table can thus comprise a two-dimensional or multidimensional table for the first measurement variable 5*a* and the second measurement variable 5*b*. For each column that corresponds to a value for the first measurement variable 5*a* and the second measurement variable 5*b*, a corresponding first threshold value 4*a* and a corresponding second threshold value (optional) 4*b* are stored in the look-up table. If the generated first diagnostic parameter 6 reaches or exceeds or falls below the corresponding threshold value 4*a*, 4*b*, the corresponding first or second message is generated and output to the higher-ranking control device 50.

It is shown that the first threshold value 4*a* and the second threshold value 4*b* are selected differently in dependence on different first and second measurement variables 5*a*, 5*b*. A spacing between the first threshold value 4*a* and the second threshold value 4*b* also differs for different first and second measurement variables 5*a*, 5*b*.

In the event that the diagnostic system 7 also generates a second diagnostic parameter, a corresponding look-up table can likewise be used, wherein the types for the first measurement variable 5*a* and the second measurement variable 5*b* are selected differently.

Stated otherwise, this specification discloses a fluid flow meter (1) configured to determine the flow of a fluid in a pipe (2), wherein the fluid flow meter (1) comprises a measurement device (8) having first and second transmission and reception units (9*a*, 9*b*) which transmit and receive ultrasonic signals 10*a*, 10*b* to and from each other, so as to generate a first measurement variable (5*a*) and at least one second measurement variable (5*b*) for the fluid, and to generate at least one first diagnostic parameter (6), wherein the fluid flow meter (1) further comprises an acoustic sensor to sense acoustic signals (dB) from a disturbance of the fluid in the pipe (2) so as to generate the at least one first diagnostic parameter (6) comprising the sensed acoustic signals (dB), wherein the fluid flow meter (1) further comprises a diagnostic system (7) that comprises a trained AI module to determine a first threshold value (4*a*) for the at least one first diagnostic parameter (6) based on the first measurement variable (5*a*) and the at least one second measurement variable (5*b*) and the diagnostic system (7) outputs a first message when the at least one first diagnostic parameter (6) reaches said first threshold value (4*a*).

Figure 4:
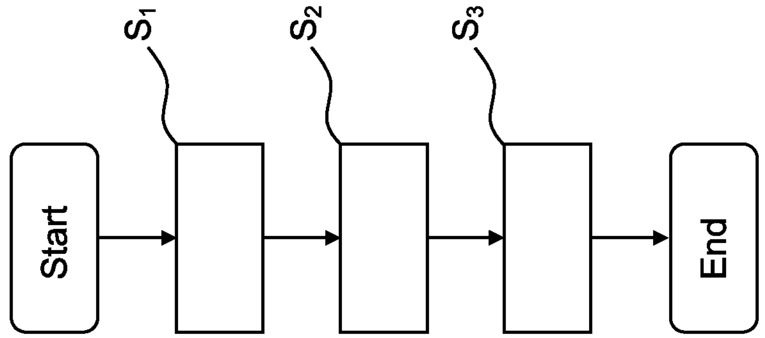
FIG. 4: a method for operating a fluid flow meter.

FIG. 4 shows a method for operating the fluid flow meter 1. In a first method step $S_1$, the first measurement variable 5*a* and the at least one second measurement variable 5*b* are generated for the fluid 3. At least one first diagnostic parameter 6 is then generated. In a second method step $S_2$, a first threshold value 4*a* for the at least one first diagnostic parameter 6 is determined based on the first measurement variable 5*a* and the at least one second measurement variable 5*b*. In a third method step $S_3$, the first message is output to the higher-ranking control device 50 when the first threshold value 4*a* is reached or exceeded by the at least one first diagnostic parameter 6 that is in particular continuously newly generated.

Stated otherwise, this specification discloses a method for operating a fluid flow meter (1) that is configured to determine the flow of a fluid in a pipe (2), wherein the method comprises the following method steps:

using the fluid flow meter (1) comprising a measurement device (8) having first and second transmission and reception units (9*a*, 9*b*) which transmit and receive ultrasonic signals 10*a*, 10*b* to and from each other to generate a first measurement variable (5*a*) and at least one second measurement variable (5*b*) for the fluid, and to generate at least one first diagnostic parameter (6); wherein the fluid flow meter (1) further comprises an acoustic sensor to sense acoustic signals (dB) from a disturbance of the fluid in the pipe (2) so as to generate the at least one first diagnostic parameter (6) comprising the sensed acoustic signals (dB), using a diagnostic system (7) comprising a trained AI module to determine a first threshold value (4*a*) for the at least one first diagnostic parameter (6) based on the first measurement variable (5*a*) and the at least one second measurement variable (5*b*);

wherein the diagnostic system (7) outputs a first message to a higher-ranking control device (50) when the at least one first diagnostic parameter (6) reaches the first threshold value (4*a*).

The invention is not restricted to the embodiments described. Within the scope of the invention, all the described and/or drawn features can be combined with one another as desired.

| Reference numeral list | |
|---|---|
| fluid flow meter | 1 |
| pipe | 2 |
| fluid | 3 |
| first threshold value | 4a |
| second threshold value | 4b |
| first measurement variable | 5a |
| second measurement variable | 5b |
| first diagnostic parameter | 6 |
| diagnostic system | 7 |
| measurement device | 8 |
| first transmission and reception unit | 9a |
| second transmission and reception unit | 9b |
| first ultrasonic signal | 10a |
| second ultrasonic signal | 10b |
| pressure sensor | 11 |
| temperature sensor | 12 |
| memory unit | 13 |
| AI module | 14 |
| control device | 50 |
| output unit | 51 |
| monitoring system | 100 |
| method steps | $S_1$, $S_2$, $S_3$ |

The invention claimed is:

1. A fluid flow meter to determine the flow of a fluid in a pipe, wherein the fluid flow meter comprises a measurement device having first and second transmission and reception units which transmit and receive ultrasonic signals to and from each other, so as to generate a first measurement variable and at least one second measurement variable for the fluid, and to generate at least one first diagnostic parameter, wherein the fluid flow meter further comprises an acoustic sensor to sense acoustic signals (dB) from a disturbance of the fluid in the pipe so as to generate the at least one first diagnostic parameter comprising the sensed acoustic signals (dB), wherein the fluid flow meter further comprises a diagnostic system that comprises a trained AI module to determine a first threshold value for the at least one first diagnostic parameter based on the first measurement variable and the at least one second measurement variable, and the diagnostic system outputs a first message when the at least one first diagnostic parameter reaches said first threshold value.

2. The fluid flow meter according to claim 1, wherein the fluid is in a form of gas.

3. The fluid flow meter according to claim 1, wherein the diagnostic system is configured to output the first message to a higher-ranking control device.

4. The fluid flow meter according to claim 3, wherein the diagnostic system is configured to determine a second threshold value for the at least one first diagnostic parameter, and to output a second message to the higher-ranking control device when the at least one first diagnostic parameter reaches said second threshold value, wherein the first message is a warning message or a fault message and wherein the second message is a fault message or a warning message.

5. The fluid flow meter according to claim 4, wherein the at least one first diagnostic parameter is based on the first measurement variable and the at least one second measurement variable.

6. The fluid flow meter according to claim 1, wherein the first measurement variable is a physical measurement value of the fluid or a variable derived from a physical measurement value.

7. The fluid flow meter according to claim 1, wherein the at least one second measurement variable is a physical measurement value of the fluid or a variable derived from a physical measurement value.

8. The fluid flow meter according to claim 1, wherein the first measurement variable is selected from the following fluid properties:

a) fluid flow rate;

b) speed of sound in the fluid; or c) speed of sound in the fluid normalized to pressure and temperature.

9. The fluid flow meter according to claim 1, wherein the at least one second measurement variable is selected from the following fluid properties:

a) fluid flow velocity;

b) speed of sound in the fluid; or c) speed of sound in the fluid normalized to pressure and temperature, wherein the first and the second measurement variables comprise different fluid properties.

10. The fluid flow meter according to claim 1, wherein the at least one first diagnostic parameter describes a measurement capability of the fluid flow meter or allows conclusions to be drawn about a measurement capability.

11. The fluid flow meter according to claim 1, wherein the at least one first diagnostic parameter is a signal-to-noise ratio or a turbulence of the fluid.

12. The fluid flow meter according to claim 11, wherein the fluid flow meter comprises a measurement device configured to detect the first measurement variable and the at least one second measurement variable, wherein the signal-to-noise ratio relates to the first measurement variable and/or the second measurement variable.

13. The fluid flow meter according to claim 1, wherein the diagnostic system comprises a memory unit in which a look-up table is stored, wherein the diagnostic system is configured to read out the first threshold value for the at least one first diagnostic parameter from the look-up table in dependence on the first measurement variable and the at least one second measurement variable.

14. The fluid flow meter according to claim 1, wherein the diagnostic system comprises an AI module, wherein the AI module is configured to determine the first threshold value for the at least one first diagnostic parameter in dependence on the first measurement variable and the at least one second measurement variable.

15. The fluid flow meter according to claim 1, wherein the fluid flow meter is configured to generate at least one second diagnostic parameter that is different from the first diagnostic parameter, wherein the diagnostic system is configured to determine a first threshold value for the at least one second diagnostic parameter based on the first measurement parameter and the at least one second measurement parameter in order to output a first message to a higher-ranking control device when the at least one second diagnostic parameter reaches said first threshold value.

16. The fluid flow meter according to claim 1, wherein the fluid flow meter comprises a measurement device having the first transmission and reception unit and the second transmission and reception unit, wherein the first transmission and reception unit is configured to generate and transmit a first ultrasonic signal and to receive a second ultrasonic signal and wherein the second transmission and reception unit is configured to generate and transmit the second ultrasonic signal and to receive the first ultrasonic signal, wherein the first transmission and reception unit and the second transmission and reception unit are attached to the pipe offset both in the peripheral direction and in the axial direction, and wherein the measurement device is configured to determine the first measurement variable and the second measurement variable.

17. The fluid flow meter according to claim 16, wherein the first transmission and reception unit is configured to transmit the first ultrasonic signal through the interior of the pipe to the second transmission and reception unit and wherein the second transmission and reception unit is configured to receive the first ultrasonic signal and wherein the second transmission and reception unit is configured to transmit the second ultrasonic signal through the interior of the pipe to the first transmission and reception unit and wherein the first transmission and reception unit is configured to receive the second ultrasonic signal.

18. The fluid flow meter according to claim 16, wherein the measurement device comprises at least one pressure sensor configured to measure a pressure of the fluid inside the pipe.

19. The fluid flow meter according to claim 16, wherein the measurement device comprises at least one temperature sensor configured to measure a temperature of the fluid inside the pipe.

20. A monitoring system comprising at least one fluid flow meter according to claim 1 and a control device, wherein the at least one fluid flow meter is attached to a pipe and wherein the at least one fluid flow meter is configured to determine how much fluid flows through the pipe in a certain time and wherein the at least one fluid flow meter is configured to transmit the first message to the control device and wherein the control device is configured to present the first message or a message derived therefrom visually and/or acoustically.

21. A method for operating a fluid flow meter that is configured to determine the flow of a fluid in a pipe, wherein the method comprises the following method steps:

using the fluid flow meter comprising a measurement device having first and second transmission and reception units which transmit and receive ultrasonic signals to and from each other to generate a first measurement variable and at least one second measurement variable for the fluid, and to generate at least one first diagnostic parameter, wherein the fluid flow meter further comprises an acoustic sensor to sense acoustic signals (dB) from a disturbance of the fluid in the pipe so as to generate the at least one first diagnostic parameter comprising the sensed acoustic signals (dB);

using a diagnostic system comprising a trained AI module to determine a first threshold value for the at least one first diagnostic parameter based on the first measurement variable and the at least one second measurement variable;

wherein the diagnostic system outputs a first message to a higher-ranking control device when the at least one first diagnostic parameter reaches the first threshold value.

* * * * *